United States Patent [19]

Henze

[11] Patent Number: 4,678,984
[45] Date of Patent: Jul. 7, 1987

[54] DIGITAL POWER CONVERTER INPUT CURRENT CONTROL CIRCUIT

[75] Inventor: Christopher P. Henze, Eagan, Minn.

[73] Assignee: Sperry Corporation, Blue Bell, Pa.

[21] Appl. No.: 854,243

[22] Filed: Apr. 21, 1986

[51] Int. Cl.⁴ .............................................. G05F 1/44
[52] U.S. Cl. .................................. 323/285; 323/283; 323/277; 361/57; 361/93
[58] Field of Search ............... 323/282, 283, 284, 285, 323/286, 276, 277; 361/57, 58, 93, 111

[56] References Cited

U.S. PATENT DOCUMENTS

| | | | |
|---|---|---|---|
| 3,725,739 | 4/1973 | Griffey | 361/57 |
| 3,733,540 | 5/1973 | Hawkins | 321/47 |
| 3,809,999 | 5/1974 | Smith | 323/285 |
| 3,959,714 | 5/1976 | Mihelich | 323/17 |
| 4,195,335 | 3/1980 | Murakami et al. | 323/285 X |
| 4,307,440 | 12/1981 | Inoue et al. | 363/15 |
| 4,363,064 | 12/1982 | Billings et al. | 361/57 |
| 4,428,015 | 1/1984 | Nesler | 323/285 X |
| 4,442,339 | 4/1984 | Mizuno et al. | 323/285 X |
| 4,494,064 | 1/1985 | Harkness | 323/277 |
| 4,513,341 | 4/1985 | Kollanyi | 361/58 X |
| 4,517,618 | 5/1985 | Frank | 323/285 X |
| 4,553,082 | 11/1985 | Nesler | 323/282 X |

OTHER PUBLICATIONS

D. Newton, High Speed Electronic Circuit Breaker, Circuit Techniques, 1985, p. 17.
J. C. Sturman, Design of High Voltage, High-Power, Solid-State Remote Power Controllers for Aerospace Applications, Proc. ESA, PESC, 1985, pp. 207-216.
C. Neveu and D. Levins, Design & Development of a Current Limited Solid State Hybrid Switch, Proc. ESA, PESC, 1985, pp. 281-285.
R. Adair, Limiting Inrush Current to a Switching Power Supply Improves Reliability, Efficiency, EDN, May 20, 1980.

Primary Examiner—Patrick R. Salce
Assistant Examiner—Anita M. Ault
Attorney, Agent, or Firm—Glenn W. Bowen

[57] ABSTRACT

A digital power converter input current control circuit is connected between a power converter and a power source. This circuit monitors, and controls if necessary, the current that flows between the power source and the power converter in a manner that protects the power source, the input current control circuit, and the power converter from the catastrophic effects of excessive current flow. The input current control circuit operates similar to an electronic circuit breaker with an automatic reset feature, in that the power delivered to the power converter is maintained low during fault conditions. Thus, if a power transistor in the power converter should fail, a current limit circuit in the input current control circuit will prevent additional damage to the power converter. The operation of the input current control circuit, however, is different than that of a circuit breaker in that a control circuit in the current limit circuit allows for current limiting during startup, transient conditions which prevents the generation of "gliches" or voltage spikes on energized input power lines when the power converter is suddenly activated.

4 Claims, 3 Drawing Figures

DIGITAL POWER CONVERTER INPUT CURRENT CONTROL CIRCUIT

FIELD OF THE INVENTION

This invention relates to power current limiters, and in particular to digitally controlled switching regulators for regulating maximum current to a predetermined level.

BACKGROUND OF THE INVENTION

In prior inrush current limiting and overcurrent circuits when the current flowing from a supply to a power converter is at its maximum value the power dissipated in the power converter is at a very high level. With the input current control circuit of the present invention, power dissipation during overcurrent is at a relatively low level, and less than the maximum power dissipation that is input current control circuit occurs. In addition the input current control circuit of the present invention does not use feedback, which eliminates oscillation, which is possible in some prior switching regulators.

The following references are related to power switching regulators:

1. D. Newton, "High Speed Electronic Circuit Breaker", TMOS Power FET design ideas, Motorola, 1985.
2. J. C. Sturman, "Design of high voltage, high power, solid-state, remote power controllers for aerospace applications", Proceedings of the ESA, PESC, 1985.
3. C. Neveu and D. Levins, "Design and development of a current limited solid stated hybrid switch", Proceedings of ESA PESC, 1985.
4. R. Adair, "Limiting inrush current to a switching power supply improves reliability, efficiency", EDN, May 20, 1980.

In reference 1, a Field-effect Transistor (FET) is used as a circuit breaker, but inrush current limiting and automatic reset are not provided. In reference 2, as well as reference 3, the circuits described are current limited switches that may be closed or opened from a remote location. These designs are similar to a solid-state relay with the added feature that the relay will open when the current becomes too high, but these circuits also do not provide inrush current limiting. In reference 2, multiple FETs are used, but current sharing, as employed in the present invention is not utilized. Reference 4 refers to several standard inrush current limit techniques.

DESCRIPTION OF THE DRAWINGS

The present invention is described by reference to the drawings wherein:

FIG. 1b is a detailed schematic of the control circuit of FIG. 1a; and

TECHNICAL DESCRIPTION OF THE INVENTION

Figure 1A:
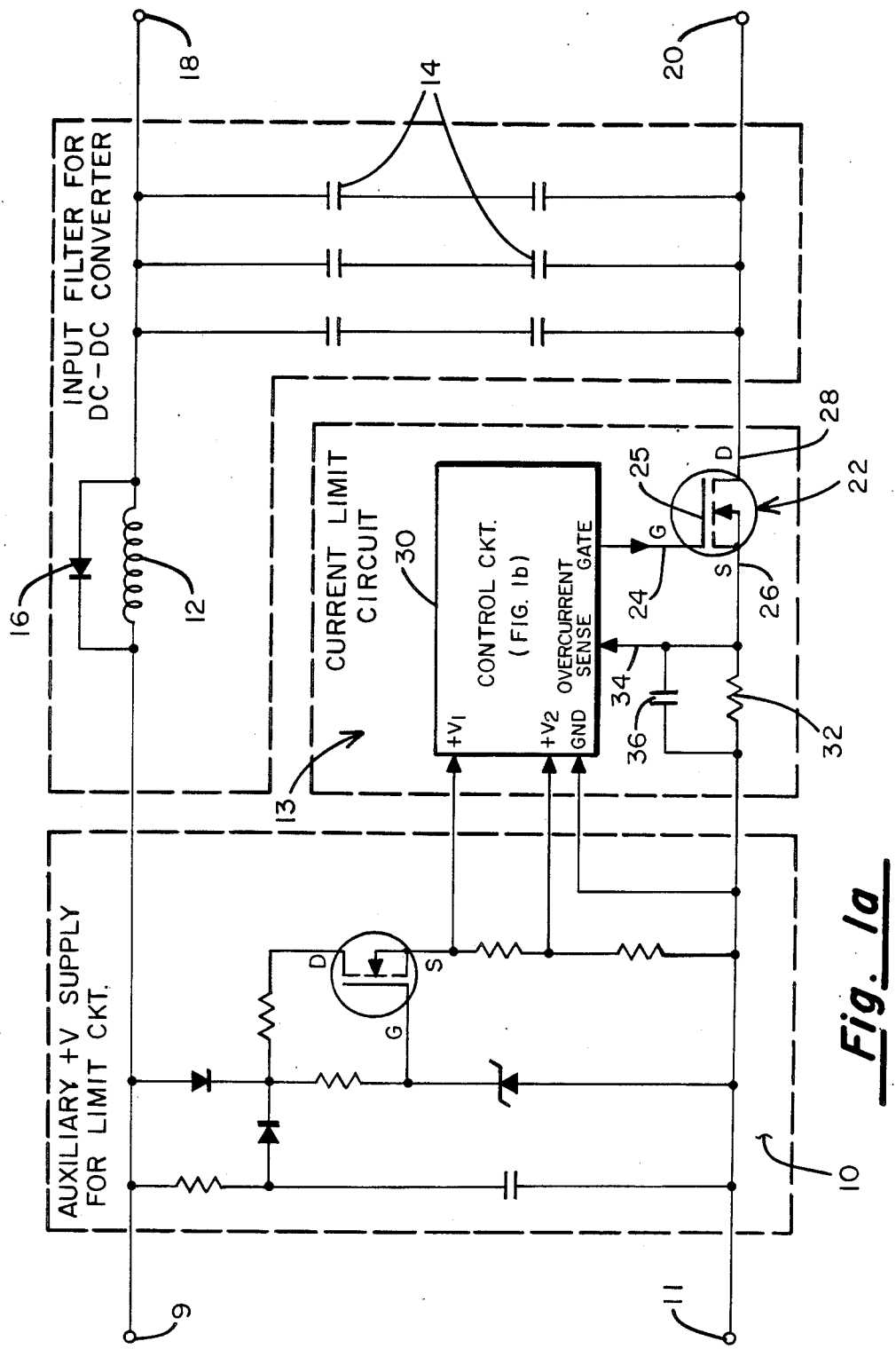
FIG. 1a is an overall schematic and block diagram of one embodiment of the present invention.

An overall block diagram and schematic of a digital input circuit for a switching power converter regulator which embodies the present invention is shown in FIG. 1a. A conventional regulated auxiliary input power supply 10 is connected across the power input terminals 9, 11. A series of capacitors 14 is connected across the output terminals 18, 20. An inductor 12 and a diode 16, which shunts the inductor 12, are connected between input terminal 9 and output terminal 18 to form an input filter for the power converter. The operation of the auxiliary power source 10, is not described in detail since it is of conventional design and may be replaced with other conventional power sources. A resistor 32 is inserted in the source-drain path of a power transistor 22. This resistor is preferably on the order of 0.1 Ohms and is used to measure the current flowing in the transistor 22 and to develop the Overcurrent Sense feedback signal that is fedback to line 34. The capacitor 36 is on the order of 1 microfarad, and is used to provide a bypass path around the resistor 32 to prevent false indications of overcurrent during transient conditions Control of the current flow between the power source 10 and the power converter (not shown), which is connected across the terminals 18, 20, is obtained by control of the power transistor 22, as conditions require, via operation of the control circuit 30. The power transistor 22 may be a Field-effect Transistor (FET) or an insulated-gate-transistor (IGT), or other type of suitable device. The transistor 22 operates as a voltage controlled current sink when the control voltage, or gate signal, on the line 24 is slightly larger than a predetermined threshold voltage. When the gate signal is much larger than the threshold voltage, the power transistor 22 presents a very low resistive impedance between its source 26 and its drain 28. When the gate signal is less than the threshold voltage, a very large impedance is presented between source and drain terminals of the transistor.

Figure 1B:
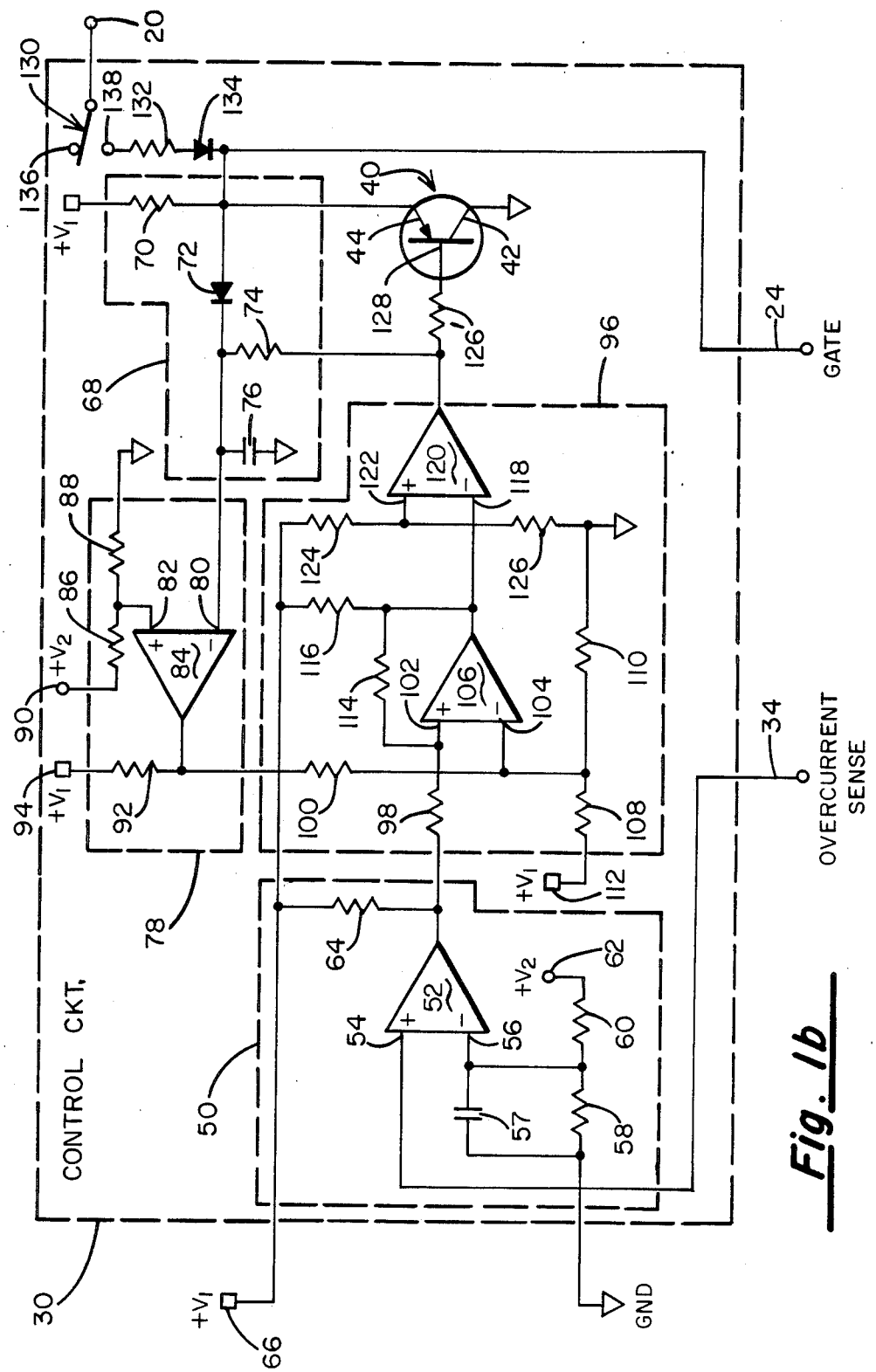

A schematic diagram of the control circuit 30 in the current limit circuit 13 of FIG. 1a is shown in FIG. 1b. Three distinct operating modes exist for the current limiting circuit of the present invention. The three modes are: inrush current limiting, normal conduction, and overcurrent protection. These modes correspond respectively to operation during the initial start up transient, during normal conduction, and during abnormal, or fault conditions. Transition from one mode to another is based on the response of the control circuit 30 as it varies the gate signal for each operating mode.

To control the charging of the capacitors 14 during the initial power-up, the control voltage, or gate signal, on the line 24 should initially be low and slowly increase with time in order to limit the inrush current to a safe level. A wide variation in threshold voltage can be tolerated in this circuit since the only result of such variation is that a variable delay occurs between the time that power is applied and the time current starts to flow. Until the threshold voltage has been reached, the increase in control voltage is small to keep the inrush current low.

Once the input capacitance has been charged, operation of the circuit transfers to the normal conduction mode. In the conduction mode, the control voltage should go to a larger, positive value to reduce the power dissipation in transistor 22 as much as possible. The current flowing between the power source and the power converter will now be limited by the operating characteristics of the power converter. The control circuit 30 monitors the current flow and if it should become too large, operation will transfer to the overcurrent mode.

When the current flowing between the power source and the power converter exceeds a preset threshold level, the operation of the control circuit 30 is switched to the overcurrent mode. In the overcurrent mode the control voltage on the line 24 is reduced to zero as rapidly as possible, to cut-off the flow of current from the power source to the power converter during a finite delay time that occurs between the detection of an overcurrent condition and the halting of current flow. The overcurrent mode may be entered from either the inrush current limit mode or the conduction mode. If the overcurrent mode is entered from the inrush current limit mode, the transistor 22 limits current flow during the overcurrent sensing time delay. If the overcurrent mode is entered from the conduction mode the filter inductor 12 also helps to limit current flow during the time delay.

The control voltage goes to approximately zero for a predetermined "off-time" in a cyclic manner, allowing the elements that were conducting excessive currents to cool off when the overcurrent mode is entered from the inrush current limit mode. After the "off-time" period has ended, the operation of the control circuits switches back to the inrush current limit mode. If the overcurrent condition was caused by some momentary fault that has been removed, such as the slip of a probe, the power converter will restart to operate normally. If the overcurrent condition was caused by an actual failure, such as the shorting of an internal component in the power converter, the operation will alternate continuously between the inrush current limit mode and the overcurrent mode.

If the overcurrent mode is latched instead of "timed-out", the control circuit will then operate as a conventional circuit breaker, and a switch will have to be thrown, (or some other external input provided), to force the attempt to restart the power converter. This variation may be desirable for certain applications and is intended to be included within the scope of the present invention.

The overcurrent operation of the control circuit 30 of FIG. 1b, is controlled by the PNP transistor 40, which has its collector 42 grounded and its emitter 44 connected to the line 24. When transistor 40 is turned-on the gate 25 of the power transistor 22 will be at a low level. The voltage across gate and source of the transistor 22 is then determined by the gate signal on line 24, which is in turn determined by the control voltage generating circuit 68 of FIG. 1b.

When power is first applied, the control circuit starts in the inrush current limit mode. The transistor 40 is initially off, and the control voltage on the line 24 on gate of the power transistor 22 slowly increases as a function of time, starting from a value that is less than the threshold voltage of the power transistor. When the control voltage on the line 24 reaches the threshold voltage of the power transistor 22, current begins to flow between the power source and the power converter through the source and drain of the transistor 22. The voltage across the source and drain will then be approximately equal to the source voltage applied between 9 and 11.

As the power converter approaches the normal, or conduction mode operation, the voltage across the source and drain terminals of the power transistor 22 drops as the input capacitance of the power converter is charged. The power dissipation in the transistor will then be very high until the capacitors 14 are fully charged. When the control voltage on the line 24 has increased to an operating level the circuit begins to function in a conduction mode. The input capacitors 14 must be fully charged before the control voltage will allow the current flowing between the source 26 and the drain 28 of the transistor 22 to become large enough to support the overcurrent mode.

If the power converter is not operating, the input capacitor may appear to be shorted (due to the failure of an internal power transistor for example). The voltage across the source and drain of the power transistor will then be at approximately the source voltage. As the control voltage increases current flowing through the source-drain path of the power transistor 22 will also increase, and the power dissipated in the power transistor will become very high. The control voltage during this time increases to the point where the overcurrent mode is entered a short enough time to prevent the power transistor from being destroyed.

Referring again to FIG. 1b, a current comparator 50 operates to sense the current that is flowing through the resistor 32 to determine when an overcurrent condition exists. This comparator consists of a difference amplifier 52, that has a noninverting input terminal 54 which is connected to the junction of the resistor 32 and the source 26 of the power transistor 22, and an inverting input terminal 56, which is supplied a reference input current through the biasing network consisting of the resistors 58, 60. One end of the resistor 58 is connected to ground, one end of the resistor 60 is connected to a positive voltage supply $V_2$ at the terminal 62.

The junction of the resistors 58, 60 is connected to the inverting input terminal 56. The output signal of the amplifier 52 is developed across the resistor 64, one terminal of which is connected to the output of the amplifier 52 and the other terminal of which is connected to the positive $V_1$ power supply at the terminal 66. The control voltage that is supplied to the gate of the transistor 22 on the line 24 is developed by the control voltage generating circuit 68, which includes the resistor 70, the diode 72, the resistor 74 and the capacitor 76. The diode 72 is poled so that positive signals will not pass through to the gate control line 24.

A voltage comparator 78, having an inverting input terminal 80 is coupled to receive the voltage developed across the capacitor 76. The noninverting input terminal 82 of the differential amplifier 84 supplied a signal through the bias network consisting of the resistors 86, 88, wherein one terminal of the resistor 86 is connected to receive a positive $V_2$ voltage on the terminal 90, and one terminal of the resistor 88 is connected to ground. The junction of the two resistors 88, 90 is connected to the noninverting input terminal 82.

The output voltage of the amplifier 84 is developed across the load resistor 92, one terminal which is connected to the $V_1$ voltage at the terminal 94. The switching control circuit 96 receives the output of the overcurrent amplifier 52 through the current limiting resistor 98, and output of the voltage comparator amplifier 84 through the limiting resistor 100. The overcurrent signal is supplied to the noninverting input terminal 102, whereas the voltage comparative signal is supplied to the inverting input terminal 104 of the differential amplifier 106. The amplifier 106 receives the signal from the overcurrent amplifier 52. The bias signal that is developed in the path consisting of the resistors 108, 110 and the terminal 112, to which the $+V_1$ supply is connected, plus the signal from the voltage comparator amplifier 84 are subtracted from the signal from the overcurrent amplifier 52. The feedback resistor 114, which causes the amplifier 106 to operate as subtractor, is connected to the load resistor 116, which in turn is connected to the terminal 66.

The output of the amplifier 106 is coupled to the inverting input 118 of a difference amplifier 120. The threshold signal is developed on the noninverting input 122 of the amplifier 120 via the path consisting of the resistors 124, 126. The resistor 126 is connected to ground while the resistor 124 is connected to the terminal 66. A current limiting resistor 126' is coupled between the output of the amplifier 120 and the base 128 of the transistor 40. When the output of the current comparator amplifier 52 is at a low level the measured current flowing into the input terminal 54 will be less than the value of the threshold current that is flowing into the input terminal 56. Correspondingly, the output of the current comparator amplifier 52 will be at a high level if the measured current flowing into the input terminal 54 is greater than the threshold current flowing into the input terminal 56. A momentary high pulse on the output of the current comparator amplifier 52 will force the output of amplifier 106 high, the output of the amplifier 120 low and the gate signal high. The control circuit then will operate in the overcurrent mode and the control voltage will be within a saturation drop of zero volts. Current will not flow between the source and drain of the power transistor 22, and the power dissiptation of the power transistor will approach zero watts.

Once the circuit is in the overcurrent mode, the capacitor 76 in the control voltage generator 68 is very slowly discharged. The discharge rate is about two orders of magnitude slower than the charging rate of the capacitor during the inrush current limit mode. The voltage comparator 84 measures the voltage across the capacitor and compares it to a preset threshold developed by the resistor 86, 88. If the voltage across the capacitor 76 is less than the present threshold, the output of the comparator 84 will be at a high level which will drive the output of the amplifier 106 low, the output of the amplifier 120 high and the gate signal low, so the circuit will operate in the inrush current limit mode.

The resistor 74 in the control voltage generator circuit 68 is much larger than the resistor 70. At the start of the inrush current limit mode, the voltage across the capacitor 76 increases with the time constant being determined approximately by the product of resistor 70 and capacitor 76. In the conduction mode, the capacitor 76 is charged to a maximum value. If the overcurrent mode is entered, the transistor 40 shorts the junction point of resistor 70 and the anode of the diode 72 to ground. The diode 72 insures that capacitor 76 will be discharged through resistor 74. In this circuit the time required to reach the overcurrent threshold depends on the R-C time constant of the capacitor 76 and the resistor 70, and the transfer characteristics of the power transistor 22. Energy dissipation of the power transistor 22 with this arrangement depends linearly on the input voltage since the inrush current is limited into essentially a short circuit.

Optionally, a feedback current path may be switched in which includes the switch 130, the resistor 132 and the diode 134. The terminal 136 is connected to the terminal 20 of FIG. 1a when the switch is in the position shown in FIG. 1b. When the switch 130 is in the opposite state the terminal 138 will be connected to the terminal 20 and the control voltage across the capacitor 76 will then increase at a faster rate when the voltage drop across terminals source and drain of the power transistor 22 is large. If the initial current resistor 132 is approximately 10 times larger than the initial current in resistor 70 at the start of the inrush current limit mode the energy dissipation during inrush current limiting into a short will be almost independent of the input voltage, and under worst case conditions a larger input filter capacitor may be accommodated with this circuit. A disadvantage of this circuit is that the transfer characteristics of power transistor 22 are still a variable in the design. The diode 134 is required to stop current from flowing through resistor 132 when the drain 28 is at a lower voltage than terminal source 26 since this would lower the control voltage increasing the power loss in the conduction mode.

Figure 2:
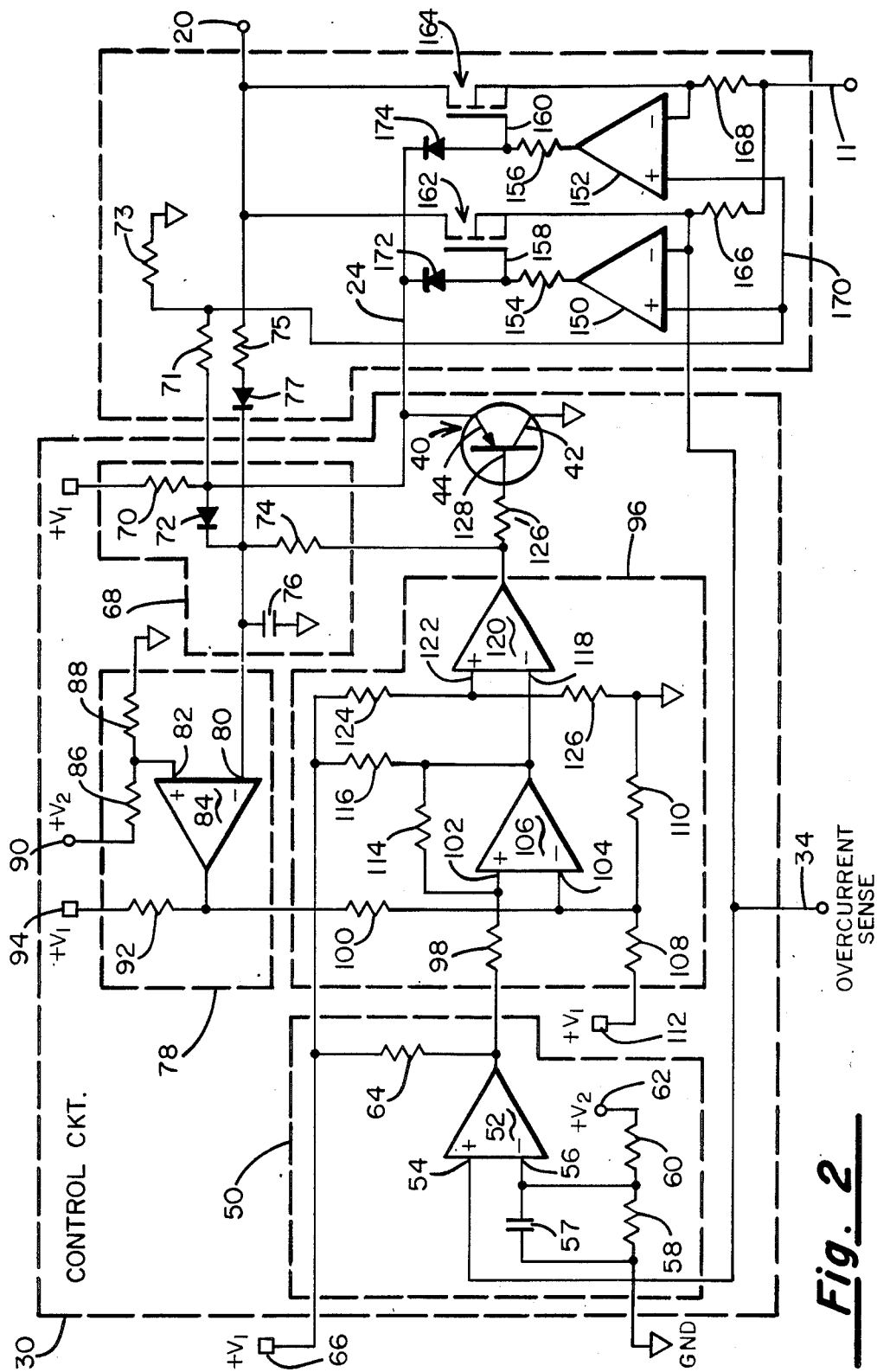
FIG. 2 is a schematic of a modified embodiment of the invention.

In the circuit of FIG. 2 an internal current feedback loop is added to the control voltage generator circuit 68 to further improve the operation of the circuit, but at the expense of additional components. Three or more additional operational amplifiers such as the amplifiers 150, 152 may be connected in parallel between the terminals 11 and 20. The amplifiers 150, 152 supply signals to the limiting resistors 154, 156 to the gates 158, 160 of the power transistors 162, 164. The power transistors 162, 164 may be either Field-effect-Transistors (FET) or insulated-gate-transistors (IGT) or other type of suitable device. The source-drain current paths of the transistors 162, 164 is in series with the shunt resistors 166, 168 so that current flowing between the terminals 11 and 20 is divided between the current paths through the resistors 166, and 168.

The overcurrent sense line 34 is connected to the inverting input terminal of the amplifiers 150, 152. The noninverting input terminals of these amplifiers are coupled on the line 170 to ground. Diodes 172, 174 are coupled between the gates of their respective power transistors 158, 160, to the gate signal control line 24, so that the cathode of the diodes is connected to the line 24 and the anode to the gates, thereby preventing the application of positive going signals to the gates. The operational amplifiers function to adjust the voltages at the gates 158, 160 in order to keep the voltages that appear on the inverting input terminals of the amplifiers 150, 152 substantially equal. This provides two advantages for the circuit over the circuit of FIG. 1b. First the performance of the circuit is now independent of the transfer characteristics of the power transistor. Second, because of the use of two or more power transistors in parallel much higher power applications may be served since variations in threshold voltage and transconductance of the power transistors effect the output to a much lesser degree.

The reference voltage for the noninverting input terminal of the amplifiers 150, 152 is developed across the resistors 71, 73 while the reference voltage for the drain of the transistors 162, 164 is developed through the resistor 75 and the diode 77 which is connected with its cathode coupled to the capacitor 76 and its anode coupled to the resistor 75.

What is claimed is:

1. An input current control having a normal operating range, coupled between an input power supply means connectable to a source of electrical power and output means connectable to a load, comprising current limit means comprising control means, current regulating means having a control terminal and a current path coupled between said input power supply means and said output means which may be selectively opened and closed in response to a control signal applied to said control terminal wherein said control signal determines whether said current path is opened or closed, and said control signal controls the magnitude of current flowing in said current path when said path is closed, inrush/normal, operation circuit means coupled to said input power supply means constructed to supply said control signal to said control terminal so as to cause said regulating means to close said current path between said input power supply means and said output means when said control signal reaches a predefined threshold magnitude, and so as to cause said regulating means to control the current flowing in said current path during normal operation of said input current control circuit, current sensing means for sensing the current flowing through said current path and signal-control means coupled to said current sensing means and to said control terminal for assuming control of said current regulating means in response to said current sensing means such that said current path will be opened upon the sensing by said current sensing means of a current flowing through said current path which is greater than a predefined overcurrent magnitude.

2. An input current control circuit as claimed in claim 1 further comprising timing means coupled to said inrush/normal operation circuit means and to said current sensing means for switching control of said current regulating means from said current sensing means to said inrush/normal operation circuit means after a predetermined period of time following each opening of said current path in response to said sensing of said overcurrent magnitude by said current sensing means.

3. An input current control circuit as claimed in claim 1 wherein said current regulating means comprises transistor means that comprises two load terminals and said control terminal, wherein said current path is between said two load terminals and said current path comprises, in the absence of an overcurrent condition, a high impedance path of gradually decreasing impedance after said current path has been connected to said input power supply means until such time that a normal operation low impedance path which is substantially constant in a magnitude is obtained.

4. An input current control circuit as claimed in claim 3 further comprising timing means coupled to said inrush/normal operation circuit means and to said current sensing means for switching control of said current regulating means from said current sensing means to said inrush/normal operation circuit means after a predetermined period of time following each opening of said current path in response to said sensing of said overcurrent magnitude by said current sensing means.

* * * * *

UNITED STATES PATENT AND TRADEMARK OFFICE
CERTIFICATE OF CORRECTION

PATENT NO. : 4,678,984
DATED : July 7, 1987
INVENTOR(S) : Christopher P. Henze

It is certified that error appears in the above-identified patent and that said Letters Patent are hereby corrected as shown below:

Column 6, line 63, after "control" insert -- circuit -- .

Signed and Sealed this

Twenty-second Day of September, 1987

Attest:

DONALD J. QUIGG

Attesting Officer     Commissioner of Patents and Trademarks